March 5, 1935.  E. J. VON PEIN  1,993,577

LOW DRUM SCALE

Filed Nov. 25, 1932   7 Sheets-Sheet 1

FIG.1.

INVENTOR
Edward J. Von Pein
BY
W. M. Wilson
ATTORNEY

March 5, 1935.  E. J. VON PEIN  1,993,577

LOW DRUM SCALE

Filed Nov. 25, 1932  7 Sheets-Sheet 2

FIG.2.

INVENTOR
Edward J. Von Pein
BY
W. M. Wilson
ATTORNEY

FIG. 3.

March 5, 1935.  E. J. VON PEIN  1,993,577
LOW DRUM SCALE
Filed Nov. 25, 1932  7 Sheets-Sheet 4

INVENTOR
Edward J. Von Pein
BY
W. M. Wilson
ATTORNEY

March 5, 1935.  E. J. VON PEIN  1,993,577
LOW DRUM SCALE
Filed Nov. 25, 1932  7 Sheets-Sheet 6

FIG.12.

March 5, 1935.  E. J. VON PEIN  1,993,577
LOW DRUM SCALE
Filed Nov. 25, 1932  7 Sheets-Sheet 7

FIG.13.

INVENTOR
Edward J. Von Pein
BY
ATTORNEY

Patented Mar. 5, 1935

1,993,577

UNITED STATES PATENT OFFICE 1,993,577

LOW DRUM SCALE

Edward J. Von Pein, Dayton, Ohio, assignor, by mesne assignments, to The Hobart Manufacturing Company, Troy, Ohio, a corporation of Ohio Application November 25, 1932, Serial No. 644,161

11 Claims. (Cl. 265—39)

This case relates to weighing and computing scales to be used on store counters.

The object of the invention is in general to provide a weighing and computing scale of a novel type for furnishing a full and convenient indication on opposite sides of the scale of the weight or price or both of an article.

More specifically, the object is to provide a scale with a plurality of separate indicating means, one for indicating to the customer and the other for indicating to the merchant weight or price or both of an article.

Further, the object is to provide such separate indicating means in the forms of charts which will completely indicate on each side of the scale throughout a full weight range of the scale and throughout the full chart capacity.

Still further, the object is to provide a low scale with a plurality of separate indicating means below the platform.

Moreover, an object is to provide a single platform and base lever system for operating separate indicating devices; for example, drum charts.

An object is also to provide a novel arrangement of levers and charts in a scale.

Another object is to provide a novel removable platform.

Still another object is to provide a novel indicator for indicating at opposite sides of the scale the rate columns of the separate drum charts to be read.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

Referring to the drawings in detail, the scale frame comprises a sheet metal base 10 in the form of a rectangular trough flanged on all sides. The side walls of the frame comprise sheet metal plates 11 provided with short horizontal flanges 12 at the lower ends which are secured by bolts 13 to the bottom of the base 10. The end walls of the frame comprise sheet metal channels 14, the vertical flanges 15 of which are secured by bolts 16 to the side walls 11.

The lower ends of channels 14 are horizontal flanges 17 secured by bolts 18 to the bottom of the base 10. The frame is thus a rigidly built-up rectangular structure of sheet metal parts consisting of a base 10, side walls 11 resting on and secured to the base and end walls 14 joining the side walls and resting on and secured to the base. Leveling feet 19 are secured to the base and hold the frame above the surface on which the scale is supported.

Figure 2:
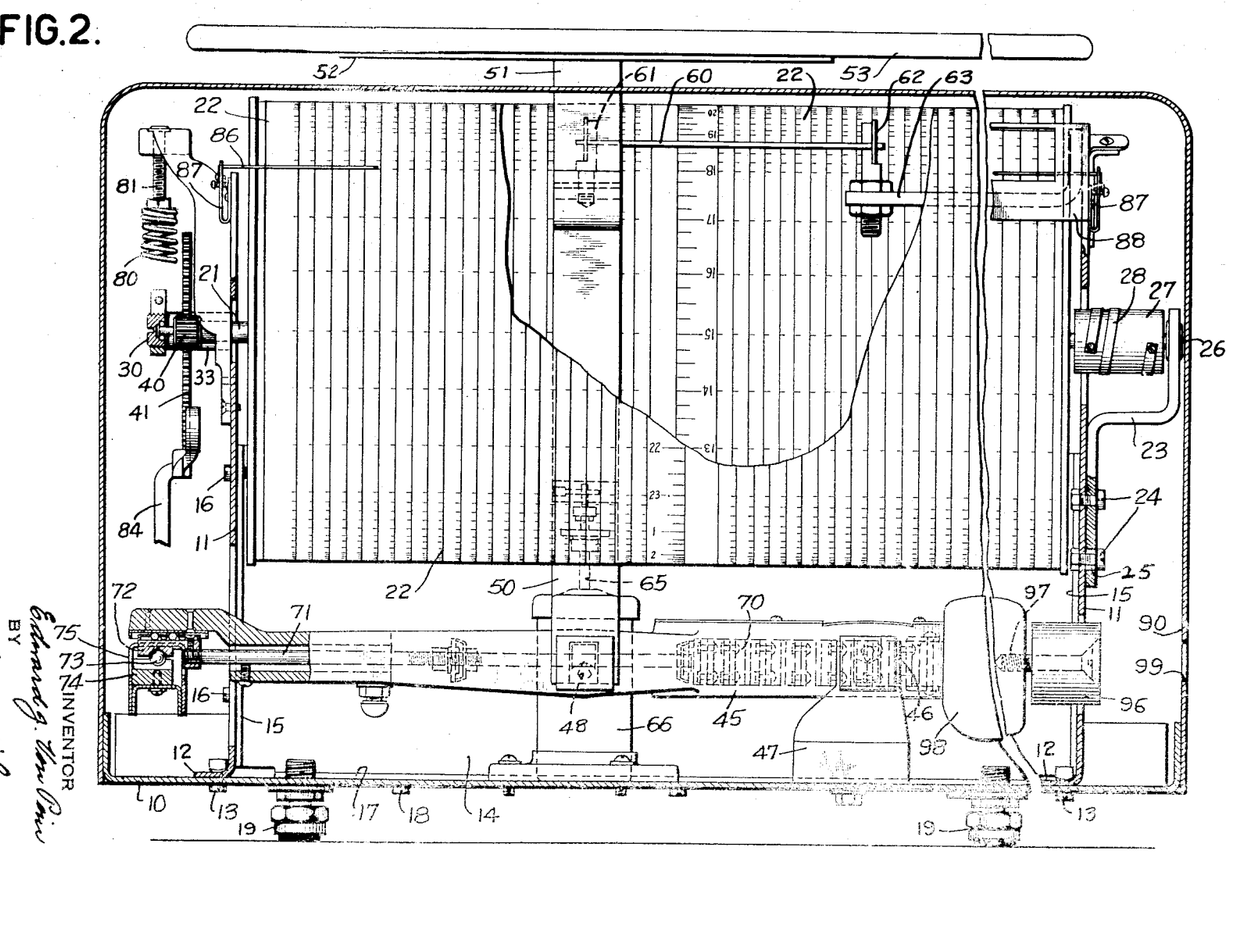
Fig. 2 is a front view with the outer casing and part of the inner frame in section and part of one indicating drum broken away to show the parts behind it.
Figure 3:
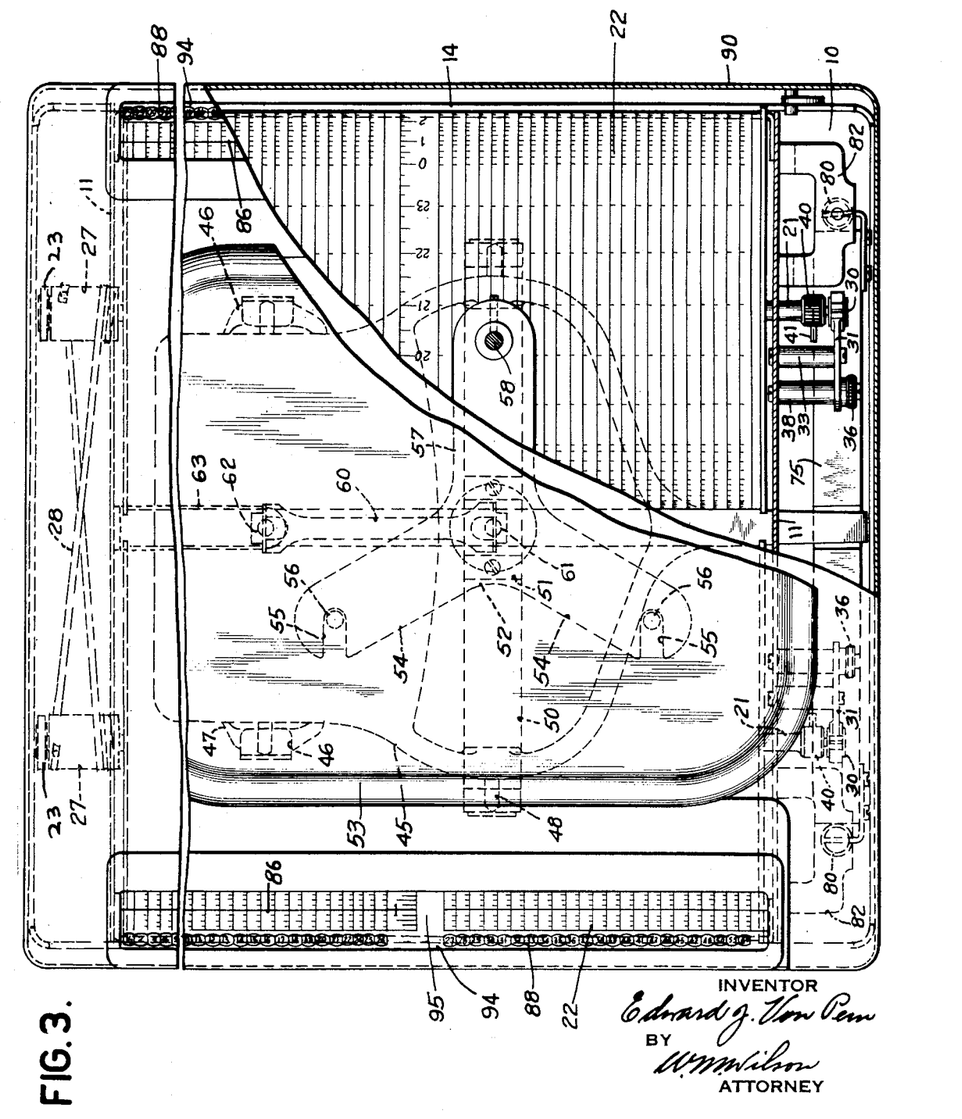
Fig. 3 is a plan view of the scale with part of the casing in section and broken away to show the interior.
Figure 4:
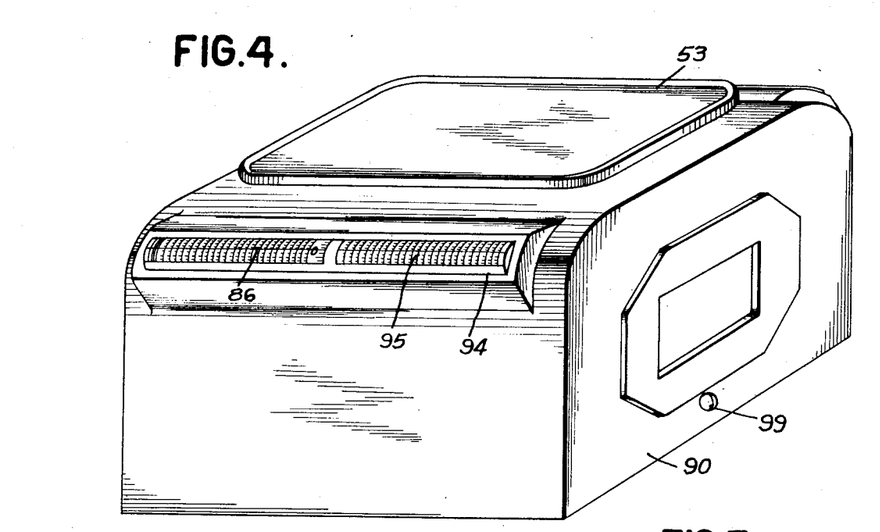
Fig. 4 is a perspective exterior view of the scale.

Mounted on the side plates 11 are the bearing supports for shafts 21 of a pair of spaced, parallel computing drum or cylinder charts 22. The bearing supports for the right hand ends of the shafts 21 (as viewed in Fig. 2) are bent brackets 23 each secured to the side plates by upper and lower bolts 24. The upper ends of the brackets carry the ball bearings 26 for journaling the right hand ends of the shafts 21 (as viewed in Fig. 2). These ends of the shafts rigidly carry drums 27 to which are fastened the opposite ends of a pair of tapes 28 which are spirally wound about the drums and leave the drums at the angle of pitch. Thus the tapes cross in a horizontal or transverse direction, as seen in Fig. 3. The spiral winding of the tapes enables them to be wound around the drums more than one complete turn without overlapping of the turns. The tapes also cross in a vertical direction so that they will transmit rotation of one shaft into opposite rotation of the other shaft. The tape connection between the chart shafts compels the latter to move exactly equal distances in absolute synchronism so that any play which may exist in the driving mechanism of the shafts, to be hereinafter described, will be eliminated or compensated for. In order to adjust the tapes to the correct tension, the brackets 23 are pivotally adjustable about the upper bolt 24 as a pivot. The lower bolt 24 passes freely through a hole 25 of larger diameter than the shank of the bolt so that the bracket may have a slight amount of play relative to the lower bolt. By loosening the grip of the bolt heads on the brackets, the latter may be pivotally adjusted about the upper bolts as pivots to move the drum chart shafts 21 further apart or closer together and thus get the correct tension on the tapes 28.

Figure 5:
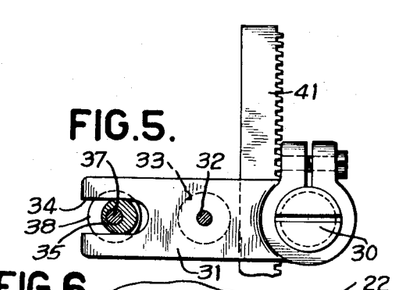
Fig. 5 is a detail of the rack and drum shaft bearing the adjustment for correctly correlating them.
Figure 6:
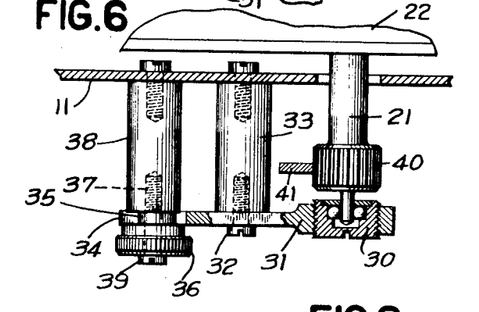
Fig. 6 is a plan sectional detail of the rack and pinion and bearing adjustment of a single chart.

The left hand ends of the shafts (as viewed in Fig. 2) are each journaled in a bearing 30 (see particularly Figs. 5 and 6) carried by the arm 31 having an intermediate hole through which a smooth part of the screw 32 passes to form a pivot for the arm. The screw is threaded into a spacer 33 fastened to a side wall and the head of the screw when tightened clamps the arm against movement about the screw. The outer end of the arm has a slot 34 (see Fig. 5) which receives the sleeve 35 fast to a knurled member 36. Passing through member 36 and eccentrically through the sleeve 35 is the smooth shank of a screw 37 threaded into the spacer element 38. The sleeve 35 is thus eccentrically pivoted on the screw 37 and by turning the member 36, the sleeve will turn eccentrically and through engagement with the walls of slot 34 vertically rock the arm 31, about the screw 32 as a pivot, in either direction depending on the direction of movement of the sleeve. As a result, the end of the arm 31 carrying bearing 30 will be adjusted vertically thereby adjusting the shaft 21 journaled in the bearing. After the proper adjustment has been made, the screw 37 is turned to clamp the head 39 thereof against member 36 and fix the latter in position. The purpose of the adjustment of the shaft 21 and its bearing is to rotate the shaft by the rolling of the pinion 40 carried by the shaft on the rack 41 and thereby obtain a zero adjustment of the chart 22 mounted on the shaft. This is a coarse adjustment enabling both charts to be adjusted to take the same proper position with respect to the sight windows and reading indices, to be later described.

The two charts 22 are located parallel to each other and closely adjacent to provide a scale of minimum length. Beneath the charts and extending in the same direction is a base lever 45 having a wide rear portion, fulcrumed at each side on the upper end of one of the branches 46 of a bifurcated stand 47 bolted to the base 10, the stand being located between the ends of the charts and substantially symmetrically disposed transversely of the charts.

The intermediate portion of the lever is provided at each side with knife edges 48 on which the lower end of an inverted generally Y-shaped platform support 50 is mounted. The branches of the platform support are substantially arcuately concave to follow the contour of the charts. The stem of the Y-shaped support extends vertically between the charts. By shaping the support 50 in this fashion, the charts may be placed closely adjacent while at the same time the lower end of the support may be spread apart underneath the charts to provide a stable connection to the base lever. The upper end of the platform support is in the shape of a horn 51 on which is mounted spider 52, on which the platform plate 53 is removably secured. Spider 52 is three-armed with two of the arms 54 being provided with open slots 55 to receive the studs 56 of the platform plate. The other arm 57 of the spider 52 has a hole at the end into which a stud 58 on the platform plate is insertible. In assembling the platform plate on the spider, studs 56 are slid into slots 55 and then the stud 58 is dropped into the hole in arm 57. The studs 56 are headed to engage the bottom of the spider but there is sufficient play allowed to permit the platform plate to tilt in order to bring the stud 58 above the spider before it is dropped into its hole. After the platform plate is in place, it is fixed in position by engaging a set screw 59 with the stud 58.

To constrain the platform structure to move vertically parallel to itself, a check device is provided which consists of a check plate 60 extending parallel to the base lever 45 and pivotally mounted at opposite ends on brackets 61 and 62. Bracket 61 is secured to the base of the horn 51 while bracket 62 is secured to the horizontal base of an angle bracket 63 the back of which is secured to the right hand side wall 11 (as viewed in Fig. 2).

The lower end of the vertical stem of the Y-shaped platform support 50 is connected to the movable parts 65 of a dash pot 66 mounted on the base 10. The dash pot is thus conveniently located between the legs of the Y support 50.

The base lever 45 is of the type having a thermostat 70 made up of a series of connected bimetallic leaf springs, secured at the rear end to the lever and at the forward end to a rod 71. A change in temperature varies the length of the thermostat to adjust the rod 71, slidably mounted on the lever, longitudinally of the lever in accordance with the temperature variations. A full understanding of the type of thermostat used may be obtained from Patents 1,185,-675 and 1,353,997. Rod 71 emerges from the nose end of the lever and there carries an inverted V-block 72 which rests on a ball 73 in turn resting in the V-groove of a block 74. The V-groove of block 72 is at right angles to the V-groove of block 74 and the ball 73 between these grooves provides a universally shiftable connection between the blocks. Changes in temperature will move block 72 longitudinally of the lever, thereby rolling ball 73 along the groove in block 74 but still maintaining the same direct downward thrust of the lever in line with the axis of the groove in block 74; while sidewise shifting of lever 45 and consequent shifting of the block 72 will shift the block along ball 73 without disturbing the direction or location of thrust of the ball 73 against block 74. Thus, no matter how block 72 shifts, the thrust of lever 45 is always directly downward on ball 73 and in the same line which is defined by the groove in block 74. Block 74 is carried by the equalizer or draw bar 75 which is of channel or U-shaped cross-section and extends an equal distance to each side of the longitudinal axis of the lever. To prevent displacement of the pivot block 72 out of coaction with ball 73 and pivot block 74, a yoke 750 is secured to the top of the bar 75. To this yoke is pivoted a plate 751 which limits upward movement of the lever relative to equalizer bar 75. When it is desired to remove the lever from coaction with the bar, the plate 751 is shifted on its pivot to displace it from the path of the lever which can then be freely lifted out.

Each end of the bar 75 has a pair of threaded holes for receiving screws 76 which pass through elongated slots 77 in one side of angle brackets 78. The heads of the screws clamp the brackets to the bar 75 and by the provision of the elongated slots, the brackets may be shifted longitudinally of the bar, thereby adjusting the moment arms of the brackets on the bar, considering the line of application of ball 73 as the fulcrum line of the bar.

Each bracket 78 is an angle piece as explained above, one side extending along bar 75 and the other being bent at right angles thereto and hooking onto the plate 79 to which the lower end of a counterbalancing spring 80 is connected. The upper end of the counterbalancing spring is secured to a bolt 81 carried by a U-shaped bracket 82 made of zinc or a similar material secured at its lower end to the frame wall 11. The expansion of bracket 82 with increase in temperature raises the support of the upper end of the spring 80, thereby lifting the entire spring to keep the lower end of the spring at a constant level even though the spring has stretched due to temperature rise. The equalizer 75 will therefore not change its level because of temperature changes and the drum indications will remain at zero with no load on the scale. For a full understanding of the theory of operation of the thermostat mounting of the counterbalance spring, reference is directed to Patent 1,065,808.

The draw bar 75 has a hole adjacent each end to rotatably receive the lower circular end 83 of a bar 84 which carries the rack 41, previously described coacting with the pinions 40 on one end of each chart shaft 21.

The weighing operation can now be briefly described. A load placed on platform 53 will rock the nose end of lever 45 downwardly, correspondingly depressing equalizer bar 75 which will stretch the springs 80 and at the same time cause the racks 41 to rotate pinions 40 and the charts 22 equal amounts. Any play between the parts associated with a chart which might cause the latter to vary slightly in its movement with respect to the movement of the other chart is obviated by the action of the crossed tapes 28, in the manner previously explained. In the sealing of the scale, should it be found that both the springs are not of equal resistant strength, the elements 78 may be adjusted to vary the moment arm of each spring on the equalizer bar 75, thus compensating for any variation in strength of the two springs.

Both charts 22 have the same value and weight readings, one chart being for observation by the customer while the other is for observation by the merchant. To provide indices for the charts, hair lines 86 are carried by clips 87 secured to opposite ends of the side walls 11. A price plate 88 is also provided to indicate the unit prices or rates on which the values of the different columns of the chart are based. The price plates are carried at each end by brackets 89 secured to the side walls 11.

The entire scale, with the exception, of course, of the platform, is enclosed by a single casing 90 which may be moved into place over the assembled scale before the platform spider 52 and platform plate 53 are in position.

Figure 1:
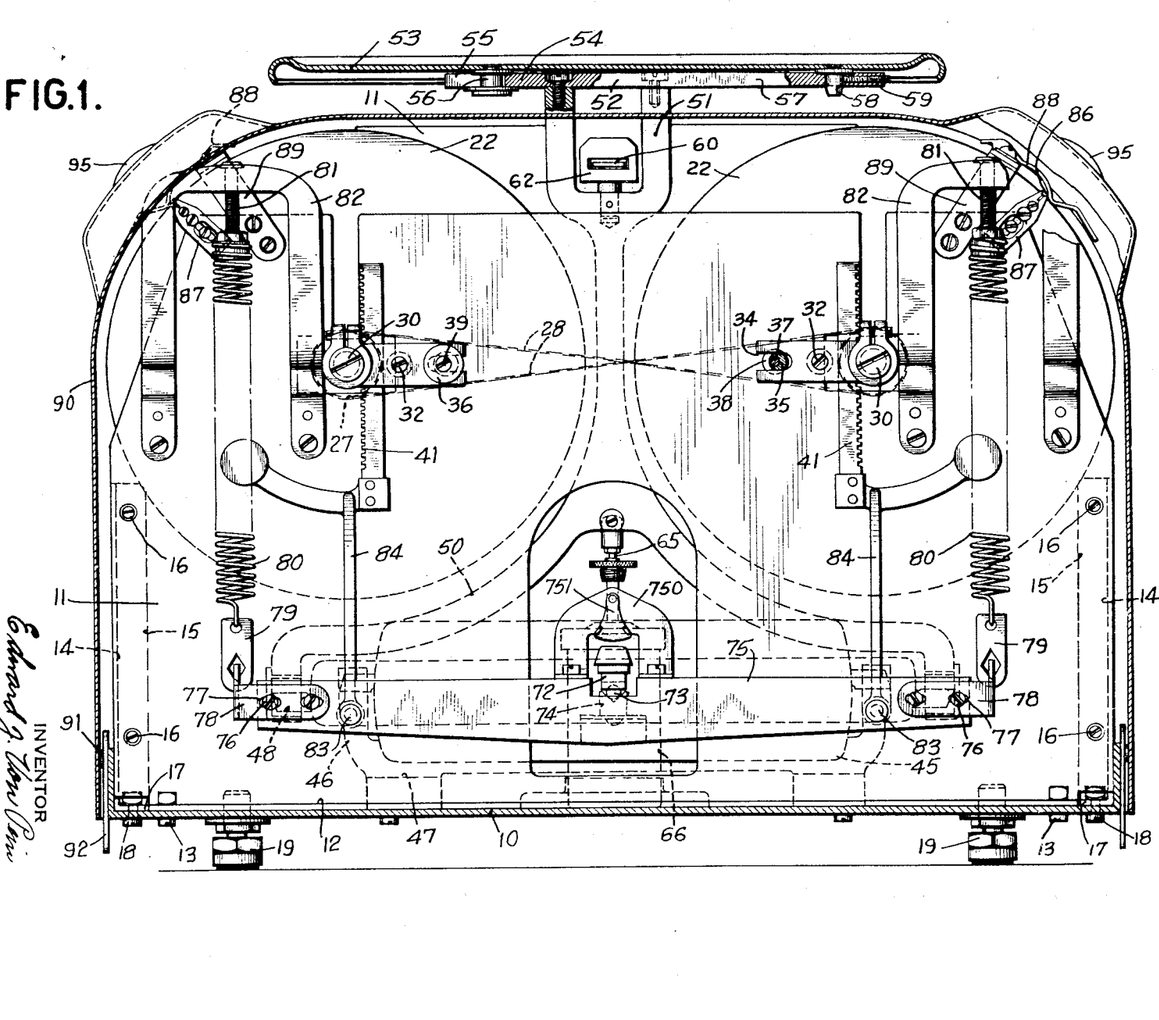
Fig. 1 is a side view of the scale with the outer casing in section.
Figure 7:
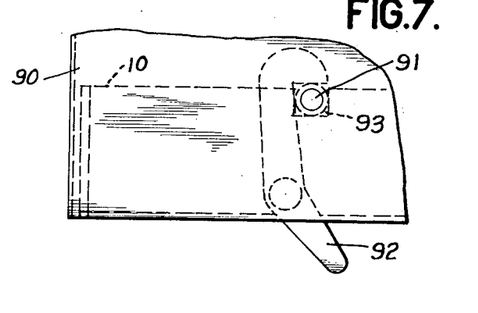
Fig. 7 is a detail of a corner of the scale showing the latch for holding the outer casing on the inner frame.

Referring to Figs. 1 and 7, the casing has adjacent the lower corners studs 91 which, when the casing is set in position, displace the cam surfaces of the tops of latches 92 pivoted to the vertical front and back flanges of the base 10 and enter notches 93 in the top of these vertical flanges. The hooks 92 are so weighted as to thereafter move over the studs 91 to hold them within the notches and thus retain the casing 90 in position. When it is desired to remove the casing, the tails of hooks 92 are operated to displace the hooks from over the studs and the casing is then free to be lifted off the scale frame. The casing is provided with sight windows 94 for the charts 22 at opposite sides of the scale. Each window has the usual lens 95 for magnifying the chart readings.

To provide a common zero adjustment affecting both charts, lever 45 has at the rear end an adjustable counterweight 96 rigidly provided with a member 97 threaded into the back of the fixed counterweight 98. Casing 90 has a hole 99 through which a screw-driver may be inserted to adjust the weight.

The advantages of the scale may be briefly summarized as follows: The visible areas of both charts are conveniently located close to and directly in front of the customer and merchant and do not require either to strain his eyes in an attempt to read a distant indication. The charts give a full price indication both to customer and merchant. The platform is completely visible to both customer and merchant. The arrangement of parts is very compact so that the scale takes up only slightly more room than any ordinary single drum scale, such as manufactured by assignee and shown in Patent No. 1,690,258. A single weighing mechanism having no more vital parts than the scale in the patent above referred to suffices to operate two drum charts, each having a complete range of price and weight readings.

Figure 8:
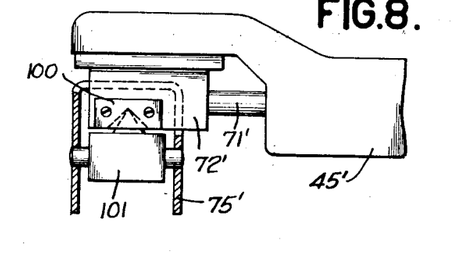
Fig. 8 is a detail view of a modification of the connection between the equalizer bar and base lever.

In Fig. 8 is shown a modified form of connection between the base lever 45' and the equalizer or draw bar 75'. In this form, the thermostat-influenced rod 71' carries at the nose end of the lever a V-grooved block 72' to the sides of which are fixed thrust plates 100. The draw bar 75' has pivoted thereto for rocking movement longitudinally of the bar a block 101 having a knife edge seated in the groove of block 72' and held from sidewise movement out of the latter block by the plates 100. The block 101 shifts with the block 72' to provide a self-alining and adjusting connection between base lever 45' and draw or equalizer bar 75'.

Figure 9:
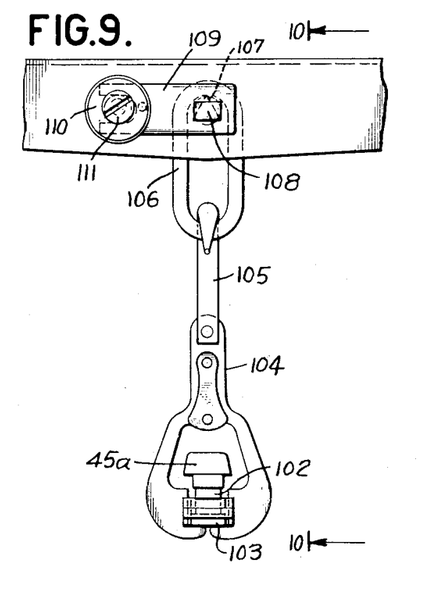
Fig. 9 is a detail view of still another modification of the connection between the equalizer bar and base lever.
Figure 10:
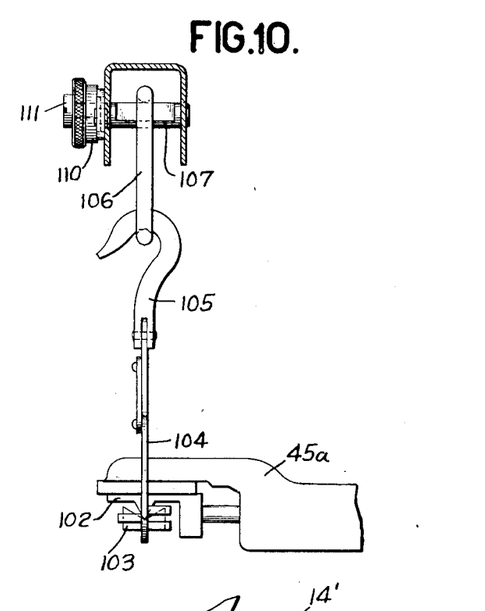
Fig. 10 is a section on line 10—10 of Fig. 9.

In Figs. 9 and 10 is shown a further modification of the connection between the base lever and the draw bar. In this form, the connection from base lever 45a comprises a nose iron 102 in the shape of an ordinary knife edge which takes the place of the upper V-block. Nose iron 102 is supported by the V-bearing 103 carried by the stirrup 104 which is pivotally pinned to a hook 105 suspended from a loop 106.

The latter rocks on a knife edge 107 supported by the draw bar. The knife edge 107 has a non-circular portion 108 at one end seated in a hole in one end of a plate 109 so that the knife edge and plate are rockable together about the axis of the knife edge. The outer end of plate 109 is slotted to receive the forward end of a bushing 110 through which eccentrically passes a clamping screw 111 threaded into the draw bar. The bushing will turn eccentrically about the screw 111 and thus rock the plate 109 up or down to angularly adjust the knife edge. After this adjustment has been made, the screw 111 is tightened to prevent further movement of the bushing.

It will be noted that in this form, sidewise or lateral shifting of the base lever and the nose iron 102 will merely swing the stirrup 104 on its pivot on hook 105 and also tend to rock the hook on the loop 106. The connection of the loop to the knife edge 108 does not shift, however. Similarly, longitudinal movement of the nose iron 102 will merely swing the hook 105 on the loop 106 without disturbing the latter's bearing on knife edge 108. Thus, the resultant, effective connection of the lever 45a to the draw bar is made at one predetermined point of the draw bar so that the moment arms of the counterbalance springs will not be varied by shifting of the lever laterally or by movement of the nose iron effected by the base lever thermostat.

Figure 11:
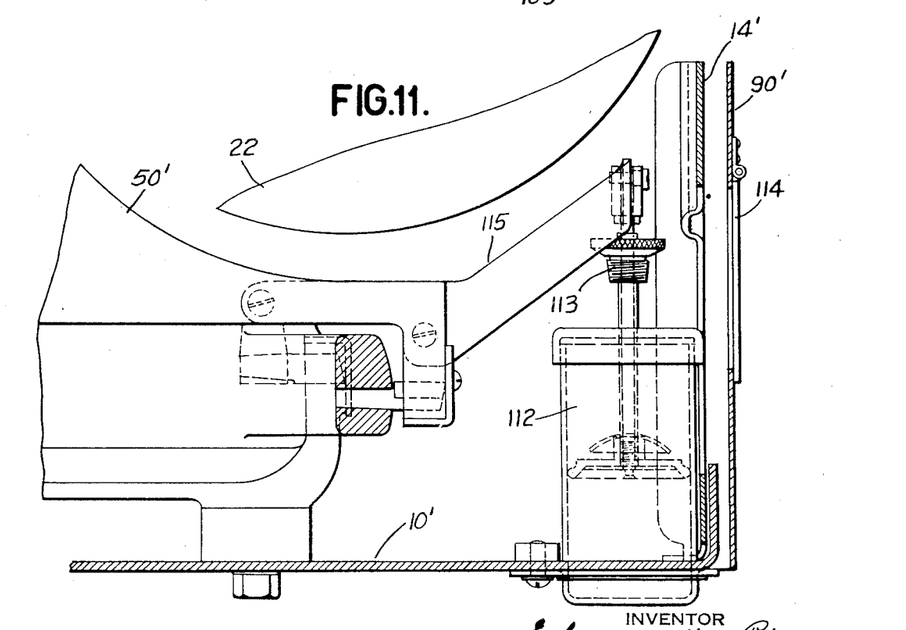
Fig. 11 is a detail view showing a modified arrangement of the dash pot.

In Fig. 11 is shown a modification of the dash pot arrangement. The dash pot 112 is set into the base 10' adjacent the end wall 14' which is cut out in front of the dash pot. The adjacent wall of the casing 90' is also open in front of the dash pot so as to permit convenient access from the outside to the valve adjusting screw 113 of the dash pot. The opening in the casing may be closed by a hinged door 114. The connection between the dash pot plunger and platform support 50' is made by securing an upwardly directed extension 115 to one leg of the support, the outer end of the extension being connected to the upper end of the plunger. The advantage of this arrangement is in the ease of assembly and accessibility for adjustment of the dash pot.

Figure 12:
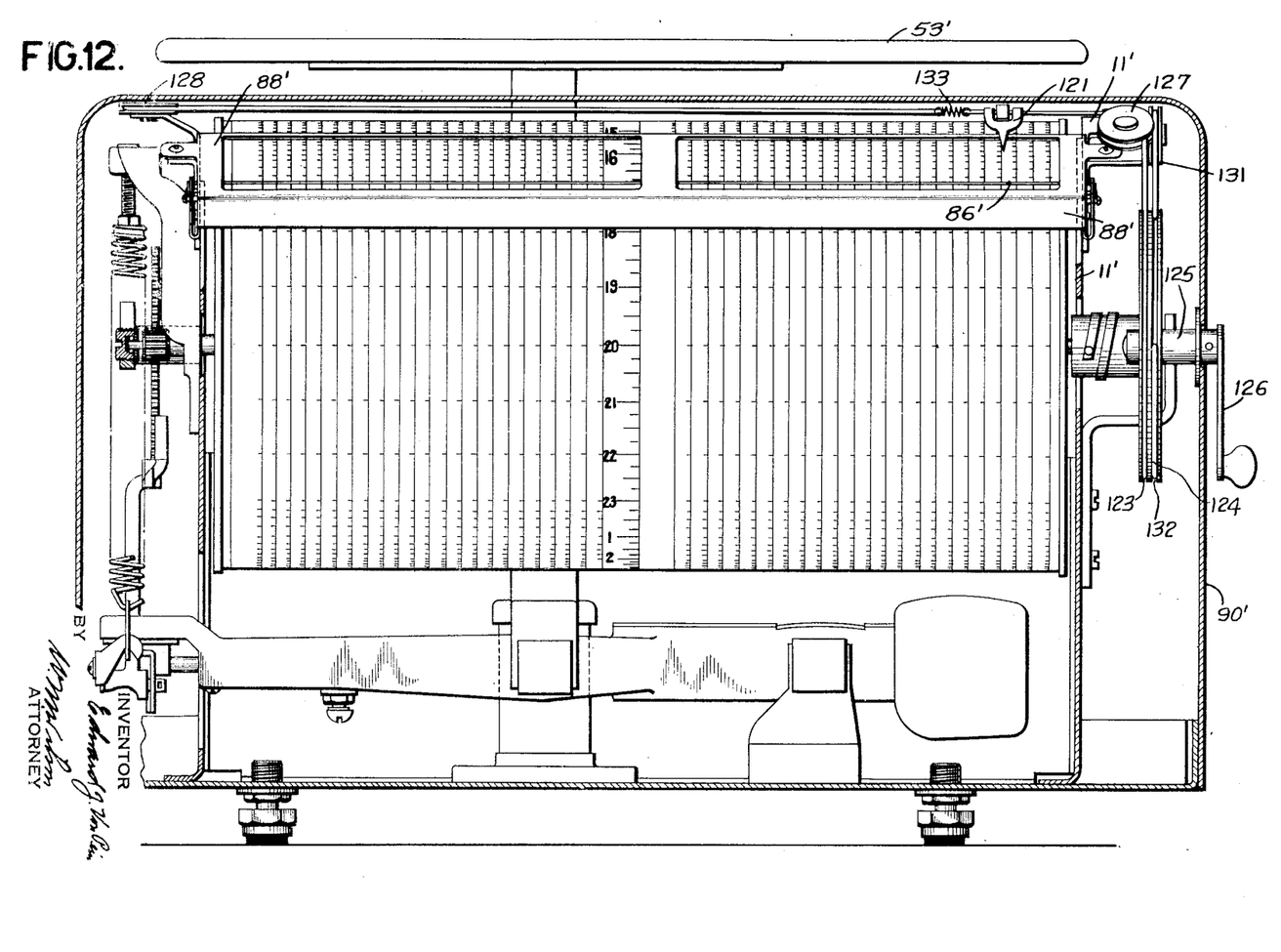
Fig. 12 is an elevation of a scale from the merchant's side with the frame in section to show the interior and with a price row indicator mechanism applied to the scale.
Figure 13:
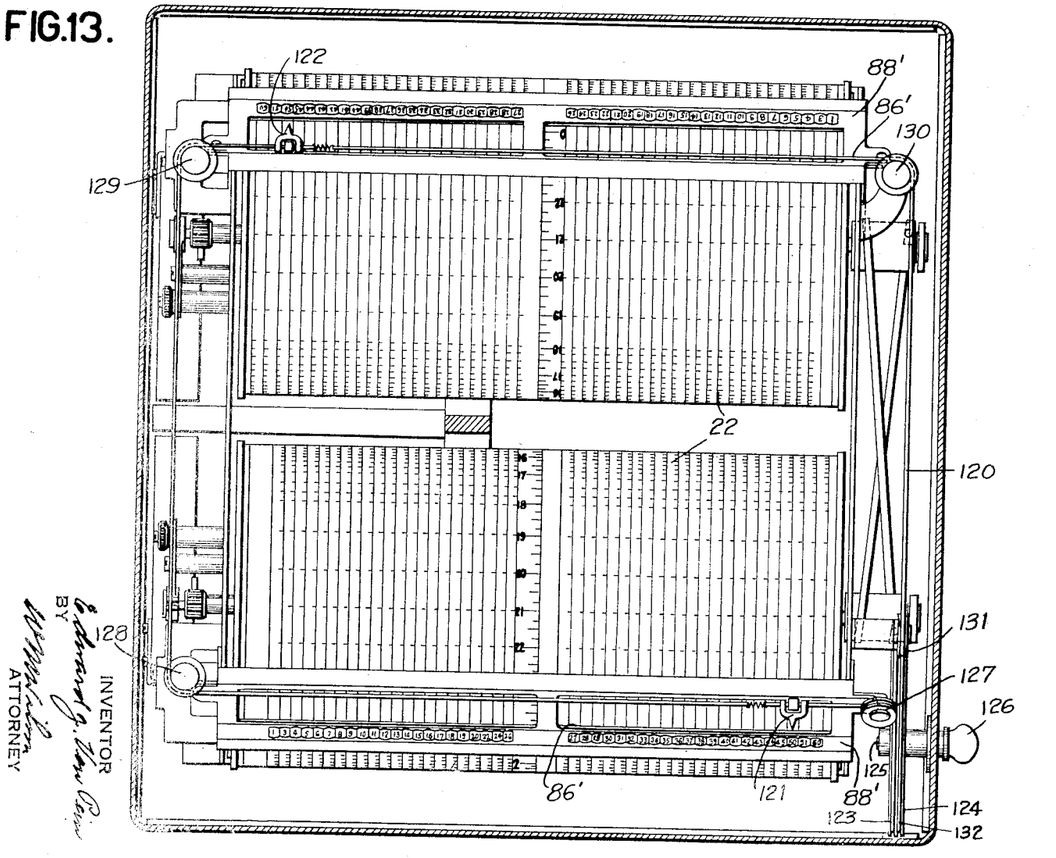
Fig. 13 is a plan sectional view through the scale of Fig. 12.

In Figs. 12 and 13 is shown a means for indicating to customer and merchant the particular price per pound columns of the charts selected for reading. Parallel lengths of a cord 120 extending axially of the charts at each side of casing 90' carry pointers 121 and 122, respectively, for the merchant's and the customer's charts. One end of the cord 120 is secured to a groove 123 of a pulley 124 fixed adjacent one end of the merchant's chart to a stub shaft 125 journaled in the end wall of casing 90', the pulley having a handle 126 for operating it. The cord extends vertically from the groove 123 into the groove of an angularly positioned guide roller 127 journaled on the scale frame plate 11'. From roller 127, the cord extends in front of and axially of the merchant's chart 22 to a roller 128, from the latter at right angles to roller 129 and then from there in front of and axially of the customer's chart to a roller 130. From roller 130, the cord extends along the ends of the charts 22 to a vertical guide roller 131 from which the cord is directed downwardly to the pulley 124 being fixed into and wound around a groove 132 in the pulley in a direction opposite to the winding of the cord in groove 123. By reason of the cords being oppositely wound on pulley 124, the rotation of the pulley in either direction positively moves the cords in corresponding directions. Springs 133 keep the cord constantly under tension, preventing slacking thereof.

Pointers 121 and 122 extend over the price faces 88' projecting into the reading space adjacent the charts. The pointers 121 and 122 are moved by operation of handle 126, which is on the merchant's side of the scale, in opposite directions to respectively point to similar columns on merchant's and customer's sides. The merchant moves the pulley 124 until the pointer is opposite the desired column indicated by the rate figures on the price face 88'. The index line 86' then gives the value in the selected column of an article placed on platform 53'.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

What is claimed is:

1. A scale having a load support, a housing provided with a plurality of separately and oppositely facing sight windows, chart means operated by the load support for furnishing indications through said sight windows, said chart means having parallel columns of indications based on different unit rates, indicators, one at each sight window, movable transversely of the chart columns to indicate the columns selected for reading, and a common flexible manually operated actuator for both indicators to simultaneously move them to corresponding columns of the chart means.

2. In a scale as a subcombination; a platform plate, a base plate on which the platform plate rests, parallel slots in one of said plates open at the outer ends, studs on the other plate movable into the open ends of the slots and along the slots to the closed ends thereof, said studs having flanges to underlie the plate with the slots and hold the plates against separation in a direction transverse to their planes, the base plate having a hole, and a pin depending from the platform which when said studs have reached the closed ends of the slots is movable into the hole to hold the plates against unintended separation in a direction parallel to their planes.

3. A scale having a platform, a frame below the platform, a horizontally disposed rotary drum chart mounted on the frame below the platform, said chart being provided with a plurality of circumferential columns of values, each column based on a different unit weight rate, the chart being disposed lengthwise with its ends substantially symmetrically arranged with respect to the platform to place all the columns of the chart within substantially the same range of observation of an operator standing in front of the platform counterbalancing means carried by the frame adjacent to and beyond the plane of one end of the chart and below the platform, movement multiplying operating connections between the platform and the chart and counterbalancing means comprising a lever fulcrumed on the frame below the platform, and having its longitudinal axis extending generally in the same direction as the axis of the chart, a single stem forming the sole support for the platform and extending downwardly from the platform about centrally between the ends of the chart and pivotally connected at the lower end to the lever, and operating connections between the counterbalancing means and a point of the lever located beyond the plane of the end of the chart adjacent to the counterbalancing means.

4. A scale comprising a pair of parallel, horizontally disposed, drum charts, lying side by side, and spaced apart in a radial and horizontal direction, a pair of shafts, one for mounting each chart, separate bearings for journaling each shaft independently of the other shaft, each chart being provided with circumferential columns of value readings, each column based on a different unit weight rate, the column of one chart at a given rate being duplicated by a column of the other chart at the same rate, a common casing for both charts with sight openings arranged at about the same level and at sides of the charts remote from each other, one opening exposing one chart at one side of the casing with its value readings upright, and the other opening exposing the other chart at the opposite side of the casing with its value readings upright whereby oppositely facing observers at opposite sides of the casing with their lines of sight at about the same level may simultaneously read duplicate value readings from the different charts, driving means for simultaneously rotating the charts to simultaneously expose through their related sight openings values corresponding to the same weight, a load platform, connections between the platform and driving means for moving the latter when a load is placed on the platform, and counterbalancing means coacting with the connections for resisting and regulating rotation of the charts in accordance with the applied load.

5. A scale comprising a pair of parallel, horizontally disposed drum charts arranged side by side and spaced apart in a radial and horizontal direction, a pair of parallel shafts, one for mounting each chart, separate bearings for journaling each shaft independently of the other shaft, said chart having circumferential columns of value readings, each column based on a different unit weight rate, the column of one chart at a given rate being duplicated by a column of the other chart at the same rate, a common casing for both charts with sight openings arranged at about the same level and at sides of the charts remote from each other, one opening exposing one chart at one side of the casing with its value readings upright and the other opening exposing the other chart at the opposite side of the casing with its value readings upright whereby oppositely facing observers at opposite sides of the casing with their lines of sight at about the same level may simultaneously read duplicate value readings on the different charts, driving means for simultaneously rotating the charts into positions to simultaneously expose through their related sight openings values corresponding to same weight, a lever below the axes of the charts, means connecting the nose end of the lever to said driving means, a load platform above the charts, a stem carrying the platform at its upper end and bearing at its lower end on said lever to cause movement of the lever and driving means when a load is placed on the platform, and counterbalancing means operatively connected to the lever for resisting and regulating rotation of the chart in accordance with the applied load.

6. A scale comprising a pair of parallel, horizontally disposed drum charts lying side by side and spaced apart in a radial and horizontal direction, a pair of shafts one for mounting each chart, separate bearings for journaling each shaft independently of the other shaft, a common casing for both charts with sight openings arranged at about the same level and at sides of the chart remote from each other, one opening exposing one chart at one side of the casing with its value readings upright, the other opening exposing the other chart at the opposite side of the casing with its value reading upright whereby the sides of the charts remote from each other may be read from opposite sides of the casing, driving means for rotating said charts, a base lever having its longitudinal axis generally parallel to the axes of the charts and disposed along a vertical plane passing through the space between adjacent sides of said charts, operating connections between the nose end of the base lever and said driving means, a load platform above the charts, a stem carrying the platform at its upper end and passing vertically through the space between said adjacent sides of the charts to bear on the lever at the lower end for communicating the force of the load on the platform to said lever, and counterbalancing means operatively connected to said lever to resist and regulate rotation of the charts in accordance with the load on the platform.

7. A scale comprising a pair of drum charts arranged side by side and spaced apart in a radial and horizontal direction, parallel shafts, one for mounting each chart, separate bearings for journaling each shaft independently of the other shaft, a common casing having opening for exposing the charts at opposite sides of the casing, an equalizer bar extending below the axes of both charts and at right angles to the axes of said charts, counterbalancing means connected to opposite ends of the equalizer bar, pinions on the chart shafts, rack elements at opposite ends of the equalizer coacting with the pinions for simultaneously rotating said shafts, a load platform and connections between the load platform and a central point of the equalizer for moving the latter against resistance of said counterbalancing means to cause the driving elements to rotate said charts through equal angles upon application of a load to said platform.

8. A scale such as defined in claim 7, and a supplementary tape drive interconnecting the shafts of said charts to take up play in the meshing teeth of the racks and pinions and thereby prevent variation in the individual movements of the chart whereby both charts expose exactly duplicate weight readings through their respective openings.

9. A scale comprising a pair of drum charts having duplicate values, and arranged horizontally, side by side, parallel to each other, and spaced apart in a direction transverse to their axes, separate shafts, each for mounting one chart, separate supports for supporting one shaft independently of the other shaft, a casing having sight windows at about the same level disposed at upwardly facing angles relative to a horizontal line joining the axes of said charts with the angle of disposition of one opening facing in the opposite direction to the angle of disposition of the other opening whereby observers at opposite sides of the casing looking downwardly through said openings may read duplicate values on the charts, a load platform above the charts, driving means for simultaneously rotating the charts to expose duplicate weight readings through the opposite openings, connections between the platform and the driving means for operating the latter when a load is placed on the platform, and counterbalancing means operatively connected to the platform for opposing movement of the platform under the load and for regulating the rotation of said charts in accordance with the load.

10. A scale having a pair of parallel drum charts, arranged side by side and spaced horizontally and radially apart, separate shafts, one for mounting each chart, separate bearings for journaling each shaft independently of the other shaft, a lever below the charts and arranged with its longitudinal axis in the same direction as the axes of said charts, driving connections between the nose end of said lever and said shafts, counterbalancing means connected to said lever for opposing movement thereof, a load platform above the charts, said lever being formed with horizontally spaced branches, each located directly under one of the charts, and an operating connection between the platform and said branches cmoprising a stem carrying the platform at its upper end, passing intermediately through the space between adjacent sides of said charts and formed at its lower end with diverging legs each generally following the curvature of one of said charts to bear at its lower end on one of the branches.

11. A scale such as defined in claim 9, and a dash pot for dampening movement of the scale parts located between said diverging legs, a plunger movable in the dash pot, and a connection between said plunger and the central portion of the stem extending between said legs.

EDWARD J. VON PEIN.